United States Patent
Natsume et al.

(10) Patent No.: US 6,736,190 B2
(45) Date of Patent: May 18, 2004

(54) VEHICLE AIR CONDITIONER

(75) Inventors: Takuya Natsume, Kariya (JP); Takahiro Tokunaga, Kosai (JP)

(73) Assignee: Denso Corporation, Kariya (JP)

( * ) Notice: Subject to any disclaimer, the term of this patent is extended or adjusted under 35 U.S.C. 154(b) by 141 days.

(21) Appl. No.: 10/114,206

(22) Filed: Apr. 2, 2002

(65) Prior Publication Data

US 2002/0139513 A1 Oct. 3, 2002

(30) Foreign Application Priority Data

Apr. 3, 2001 (JP) ........................................ 2001-105160
Apr. 17, 2001 (JP) ........................................ 2001-118425

(51) Int. Cl.[7] .................................................. B60H 3/00
(52) U.S. Cl. ........................... 165/42; 165/43; 165/204; 454/160; 237/12.3 A
(58) Field of Search .................................. 165/202, 204, 165/42, 43; 454/121, 161, 160; 237/12.3 A, 12.3 B

(56) References Cited

U.S. PATENT DOCUMENTS

| | | | |
|---|---|---|---|
| 4,216,822 A | * | 8/1980 | Izumi ........................... 165/42 |
| 4,383,642 A | | 5/1983 | Sumikawa et al. |
| 5,062,473 A | | 11/1991 | Ostrand et al. |
| 5,199,485 A | * | 4/1993 | Ito et al. ....................... 165/203 |
| 5,366,408 A | | 11/1994 | Andersson |
| 6,019,163 A | * | 2/2000 | Saida et al. .................... 165/42 |
| 6,244,335 B1 | * | 6/2001 | Nakamura et al. .......... 165/203 |
| 6,261,172 B1 | | 7/2001 | Shibata |
| 6,415,857 B1 | * | 7/2002 | Nakamura et al. .......... 165/204 |
| 6,463,998 B1 | * | 10/2002 | Shindo ......................... 165/204 |
| 6,607,029 B2 | * | 8/2003 | Danieau ....................... 165/203 |

FOREIGN PATENT DOCUMENTS

| | | |
|---|---|---|
| DE | 195 01 593 | 7/1995 |
| JP | 62-84508 | 5/1987 |
| JP | 4-113915 | 4/1992 |
| JP | 9-150620 | 6/1997 |
| JP | 10-29420 | 2/1998 |

OTHER PUBLICATIONS

European Search Report dated Aug. 21, 2003 in corresponding European Application No. EP 02 00 7313.

* cited by examiner

*Primary Examiner*—Terrell McKinnon
(74) *Attorney, Agent, or Firm*—Harness, Dickey & Pierce, PLC

(57) ABSTRACT

In a vehicle air conditioner, two foot openings are provided in right and left wall portions of a case, and are opened and closed by two foot doors, respectively. Each door surface of the foot doors is moved along a surface of the right and left wall portions for opening and closing the foot openings. A face opening is provided in a top wall part of the case to be opened an closed by a face door. An operation locus of the foot doors is overlapped with that of the face door when being viewed from a direction perpendicular to the door surface of the foot door, while the face door is operated between the foot doors to have a clearance between the face door and each foot door.

22 Claims, 13 Drawing Sheets

VEHICLE AIR CONDITIONER

CROSS-REFERENCE TO RELATED APPLICATION

This application is related to Japanese Patent Applications No. 2001-105160 filed on Apr. 3, 2001, and No. 2001-118425 filed on Apr. 17, 2001, the contents of which are hereby incorporated by reference.

BACKGROUND OF THE INVENTION

1. Field of the Invention

The present invention relates to a vehicle air conditioner with an improvement of an air passage switching structure.

2. Description of Related Art

In a conventional vehicle air conditioner described in JP-A-9-150620, a cylindrical rotary door used as an air outlet mode switching door is rotatably disposed in a case. Communication ports are provided on a part of a cylindrical surface and two end surfaces in an axial direction of the cylindrical rotary door, so that plural air-outlet openings of the case can be selectively opened and closed by rotation operation of the rotary door. However, because the plural air-outlet openings are opened and closed by using only the one rotary door, each arrangement position and each size of the air-outlet openings are restricted. Accordingly, each air amount blown from the air-outlet openings cannot be freely changed, and it is difficult to freely set a flow ratio between air blown toward an upper side of a passenger compartment and air blown toward a lower side of the passenger compartment in a bi-level mode.

To overcome this problem, plate-like doors and a rotary door may be combined. However, when the plate-like doors and the rotary door are simply combined in the case, an interference between a rotation operation of the rotary door and a rotation operation of the plate doors may be caused, and air flow disturbance and a noise may be caused. Alternatively, the size of the case of the air conditioner may be increased for restricting the interference and the air flow disturbance.

SUMMARY OF THE INVENTION

In view of the foregoing problems, it is an object of the present invention to provide a vehicle air conditioner in which air flow disturbance can be prevented while a door arrangement space can be reduced.

According to the present invention, in a vehicle air conditioner, a case defining an air passage through which air flows into a passenger compartment includes a first wall portion positioned at one side when being viewed in a flow direction of air passing through a cooling heat exchanger and a heating heat exchanger, and a second wall portion extending in a direction approximately perpendicular to the first wall portion. A first opening from which air is blown toward one side in the passenger compartment is provided in the first wall portion, and a second opening from which air is blown toward an another side in the passenger compartment is provided in the second wall portion. A first door is disposed the case for opening and closing the first opening, and a second door disposed in the case for opening and closing the second opening. The first door includes a plate member having a door surface moved along a surface of the first wall portion, and is disposed to open and close the first opening by a movement of the door surface along the surface of the first wall portion. Because the first door is constructed by a plate member moved along the surface of the first wall portion of the case, an arrangement space of the first door can be reduced, and an air flow in the case is not disturbed by the movement of the first door. Accordingly, a disturbance of the air flow in the case can be prevented, while the size of the case can be reduced.

Preferably, the first opening is provided within an area of an air mixing portion when being viewed from an opening direction of the first opening in the first wall portion. Therefore, air can be readily directly introduced into the first opening from the air mixing portion. Thus, air flow resistance can be reduced and the air flow amount introduced into the first opening can be increased, while air-flow noise can be reduced.

The first wall portion is provided at both sides of the cooling heat exchanger and the heating heat exchanger, the first opening provided in the first wall portion has two openings parts provided at both sides of the cooling heat exchanger and the heating heat exchanger to correspond to the first wall portion, and the first door has two door members for opening and closing the two opening parts of the first opening, respectively. In addition, the first door and the second door are disposed in such a manner that an operation locus of the first door is overlapped with an operation locus of the second door when being viewed from a direction perpendicular to the door surface of the first door, and the second door is disposed to be operated between the two door members of the first door to have a predetermined clearance between the second door and each door member of the first door in the direction perpendicular to the door surface of the first door. Accordingly, the arrangement space of the first and second doors can be reduced while an interference between the first and second door can be prevented.

Preferably, the first door is disposed to be rotatable around a first rotation shaft provided in the case, the second door is disposed to be rotatable around a second rotation shaft provided in the case, and each of the first rotation shaft and the second rotation shaft is disposed to extend in a direction parallel to the direction perpendicular to the door surface of the first door. Further, the first opening is formed into an approximate fan shape, the first door is formed into an approximate fan shape corresponding to the shape of the first opening, the approximate fan shape of the first opening has an outer peripheral portion having approximate arc shape, a radius center of the approximate fan shape is set at a side opposite to second rotation shaft of the second door relative to the outer peripheral portion, and the first shaft of the first door is disposed at a position corresponding the radius center of the approximate fan shape of the first opening. Accordingly, an interference between the first door and the second door can be effectively prevented while the arrangement space of the first and second doors can be further reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
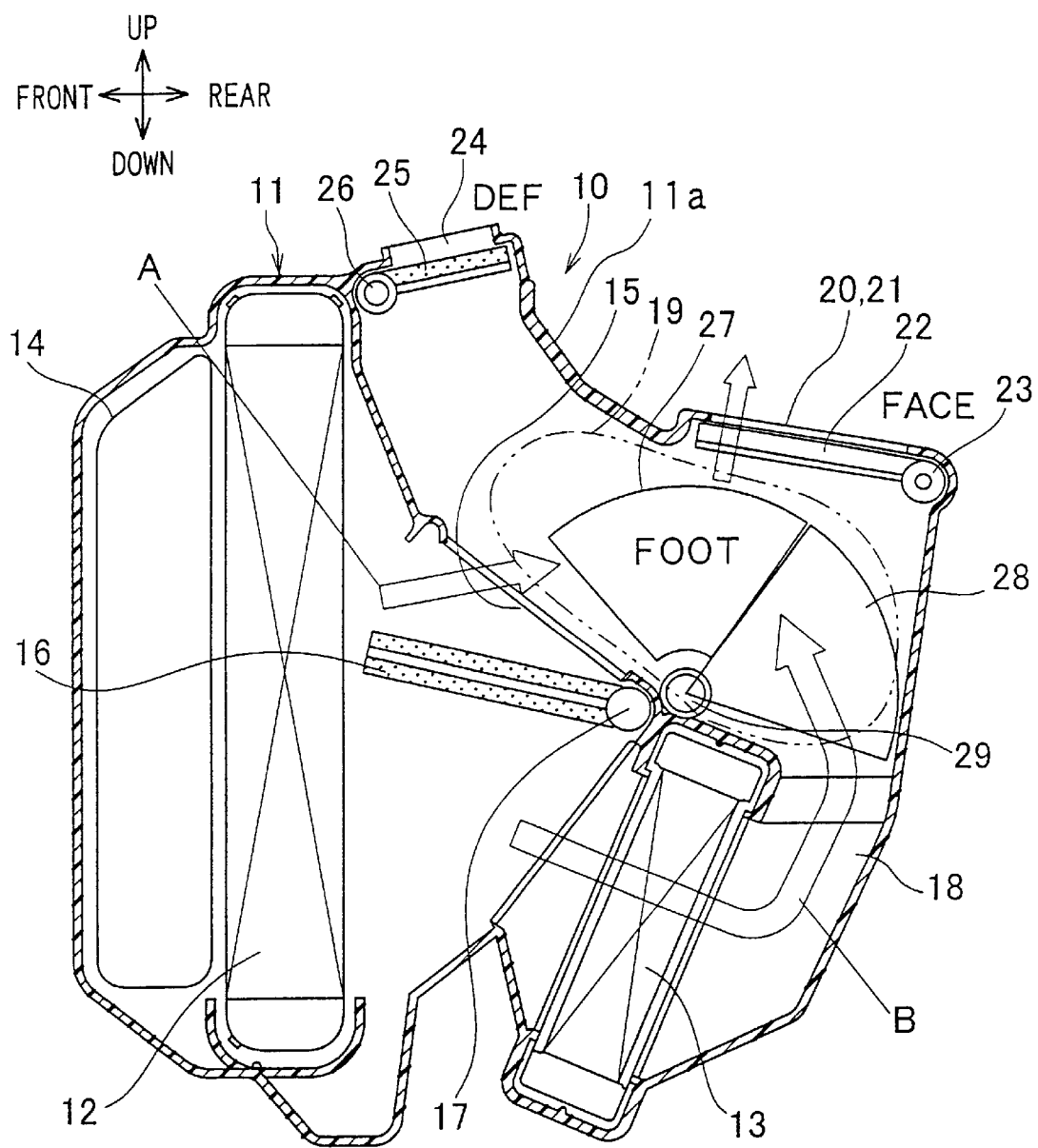
FIG. 1 is a vertical sectional view showing an air conditioning unit according to a first embodiment of the present invention.

Preferred embodiments of the present invention will be described hereinafter with reference to the accompanying drawings.

A first preferred embodiment of the present invention will be now described with reference to FIGS. 1–12. A ventilation system of a vehicle air conditioner includes an air conditioning unit 10 shown in FIGS. 1 and 2, and a blower unit for blowing air into the air conditioning unit 10. The blower unit is disposed under an instrument panel in a passenger compartment to be offset from a center to a front passenger's seat side in a vehicle width direction (right-left direction). The blower unit includes an inside/outside air switching box for selectively introducing inside air (i.e., air inside the passenger compartment) and outside air (i.e., air outside the passenger compartment), and a blower (e.g., centrifugal electrical blower) for blowing air sucked from the inside/outside air switching box.

The air conditioning unit 10 includes a resinous air conditioning case 11, an evaporator (cooling heat exchanger) 12 and a heater core (heating heat exchanger) 13. The evaporator 12 and the heater core 13 are disposed integrally in the air conditioning case 11. The air conditioning case 11 is made of a resin having an elasticity to some degree and being superior in a strength, such as polypropylene, and is composed of plural division cases. The plural division cases are integrally connected by using a fastening member such as a metal spring clip and a screw and the like.

The air-conditioning unit 10 is disposed in the passenger compartment inside the instrument panel while being arranged substantially at a center portion in the vehicle width direction. Further, the air-conditioning unit 10 is mounted on a vehicle to correspond to the arrangement shown in FIGS. 1 and 2 in a vehicle front-rear direction, a vehicle up-down direction and the vehicle right-left direction.

An air inlet 14 is provided in the air conditioning case 11 at the most front side surface. Air, blown from the blower unit 1, flows into the air conditioning case 11 through the air inlet 14.

The evaporator 12 for cooling air is disposed in the air conditioning case 11 at an immediately downstream air side of the air inlet 14. The evaporator 12 cools air passing therethrough, by absorbing evaporation latent heat of refrigerant in a refrigerant cycle system from air. Further, the evaporator 12 is disposed substantially vertically to cross an entire air passage within the air conditioning case 11, while the thickness of the evaporator 12 is made thin in the vehicle front-rear direction.

The heater core 13 is disposed at a downstream air side (vehicle rear side) of the evaporator 12 to have a predetermined distance between the heater core 13 and the evaporator 12. Further, the heater core 13 is disposed in the air conditioning case 11 at a lower side to be slightly tilted toward the vehicle rear side. In the first embodiment, each width dimension of the evaporator 12 and the heater core 13 is set to be approximately equal to a width dimension of the air conditioning case 11.

The heater core 13, in which hot water (engine-cooling water) flows, heats air flowing from the evaporator 12, using the hot water as a heating source. The heater core 13 is disposed in the air conditioning case 11 so that a bypass passage 15 is provided above the heater core 13 within the air conditioning case 11. Therefore, air from the evaporator 12 passes through the bypass passage 15 while bypassing the heater core 13.

A plate-like air mixing door 16 is disposed between the heater core 13 and the evaporator 12 to adjust a flow ratio between an air amount passing through heater core 13 and an air amount passing through the bypass passage 15 while bypassing the heater core 13.

The air mixing door 16 is integrally connected to a rotation shaft 17 disposed approximately in a horizontal direction (e.g., vehicle width direction). The air mixing door 16 is disposed to be rotatable around the rotation shaft 17. In the first embodiment, by the flow ratio adjustment of the air mixing door 16, the temperature of air blown into the passenger compartment can be adjusted.

The rotation shaft 17 is rotatably supported in the air conditioning case 11. One end of the rotation shaft 17 protrudes outside the air conditioning case 11, and is connected to an actuator using a servomotor through a link mechanism or is connected to a manual operation mechanism, so that a rotation position of the air mixing door 16 is adjusted by the actuator or an manual operation mechanism.

A warm air passage 18 extending from an air outlet side of the heater core 13 toward upwardly is provided at a downstream air side of the heater core 13. Accordingly, warm air from the warm air passage 18 and cool air from the bypass passage 15 are joined and mixed in the air mixing portion 19.

Figure 2:
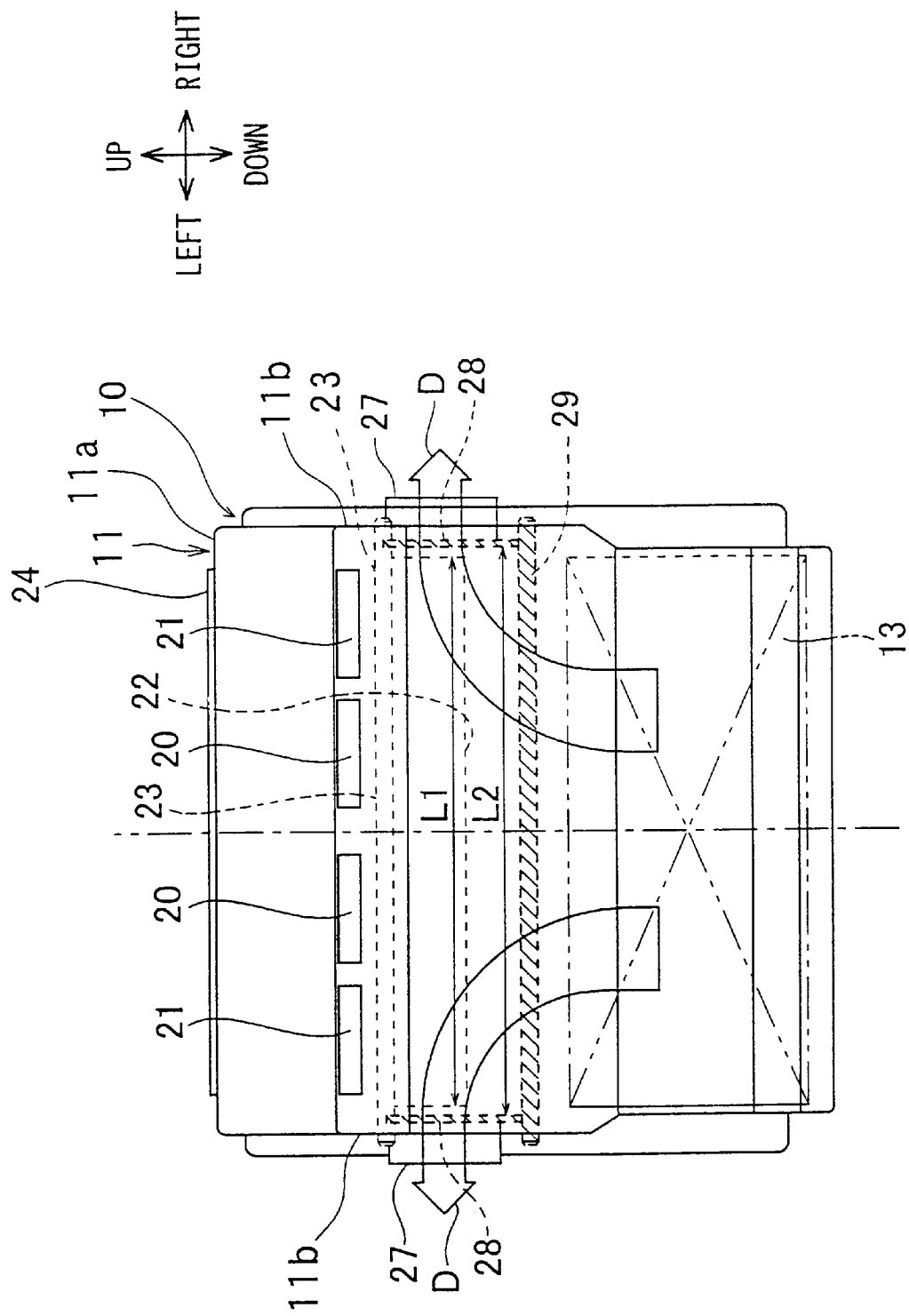
FIG. 2 is a front view showing the air conditioning unit when being viewed from an inner side of a passenger compartment.

Face openings 20, 21 are provided at a vehicle rear side position in an upper wall portion 11a of the air conditioning case 11 to be opened on the upper wall portion 11a. That is, the face openings 20, 21 are provided in the upper wall portion 11a at a direct upper side position of the air mixing portion 19. As shown in FIG. 2, the face openings 20, 21 are provided to be separated into four openings in the vehicle width direction. Specifically, two center face openings 20 are arranged at a center side position, and two side face openings 21 are arranged at right and left sides of the center face openings 20. The center face openings 20 are coupled to center-face air outlets provided at a center upper side of the instrument panel in the vehicle width direction, through a center face duct, so that conditioned air is blown toward an upper side of the passenger compartment around a center in the vehicle width direction. Similarly, the side face openings 21 are coupled to side-face air outlets provided at left and right upper-side portions on the instrument panel, through side face ducts, so that conditioned air is blown toward an upper side of the passenger compartment at both right and left sides in the vehicle width direction.

A face door 22 is disposed in the air conditioning case 11 at a lower side (inner side) of the face openings 20, 21 to open and close the face openings 20, 21. As shown in FIG. 2, the face door 22 is a thin rectangular plate door extending in the vehicle width direction. The face door 22 is connected to a rotation shaft 23 disposed at a vehicle rear end side of the upper wall portion 11a of the air conditioning case 11, to be rotated around the rotation shaft 23.

A defroster opening 24 is opened in the upper wall portion 11a of the air conditioning case 11 at a vehicle front side position of the face openings 20, 21. The defroster opening 24 is coupled to a defroster air outlet through a defroster duct, so that conditioned air from the air mixing portion 19 is blown toward an inner surface of a front windshield from the defroster air outlet. A defroster door 25 is disposed in the air conditioning case 11 at a lower side (inner side) of the defroster opening 24 to open and close the defroster opening 24. The defroster door 25 is a thin rectangular plate door extending in the vehicle width direction, similarly to the face door 22. The defroster door 25 is connected to a rotation shaft 26 disposed inside the air conditioning case 11 at a vehicle front end side of the defroster opening 24, to be rotated around the rotation shaft 26.

In addition, foot openings 27 are opened in right and left side wall portions 11b positioned at right and left sides in the air conditioning case 11 in the vehicle width direction, as shown in FIG. 2. As shown in FIG. 1, the foot openings 27 are provided at positions overlapping with an area of the air mixing portion 19 when being viewed from a side in the vehicle width direction. Each of the foot openings 27 is formed to have an approximate fan shape, so that an opening area of each foot opening 27 is enlarged from below toward an upper side. That is, the foot opening 27 is provided to have an approximate fan shape between the heater core 13 and the face openings 20, 21 in the up-down direction, so that a radial center of an arc peripheral portion of the approximate fan shape is positioned at a bottom side of the foot opening 27, and the opening area of the foot opening 27 is increased toward the upper side. Therefore, the radial center of the approximate fan shape of the foot opening 27 is provided at a position away from the rotation shaft 23 of the face door 22 relative to the arc peripheral portion of the approximate fan shape. Right and left foot doors 28 each having an approximate fan shape are disposed to be rotatable around a rotation shaft 29, for opening and closing the foot openings 27, respectively. The rotation shaft 29 is disposed at a position corresponding to the radial center of the approximate fan shape of the foot openings 27. The rotation shaft 29 is disposed to extend in the vehicle width direction, and both ends of the rotation shaft 29 are rotatably supported in the air conditioning case 11.

The foot doors 28 are disposed in the air conditioning case 11 so that door surfaces of the foot doors 28 in an axial direction of the rotation shaft 29 are moved along inner surfaces of the side wall portions 11b of the air conditioning case 11. That is, the foot doors 28 are integrally connected to the rotation shaft 29 to open and close both the foot openings 27. In the first embodiment, the foot doors 28 are integrally molded with the rotation shaft 29 using a resin, for example. The foot openings 27 are opened in the right and left side wall portions 11b so that conditioned air is blown toward foot area of the passenger in the passenger compartment. That is, conditioned air is blown toward lower right and left sides in the passenger compartment through the foot openings 27.

Figure 3:
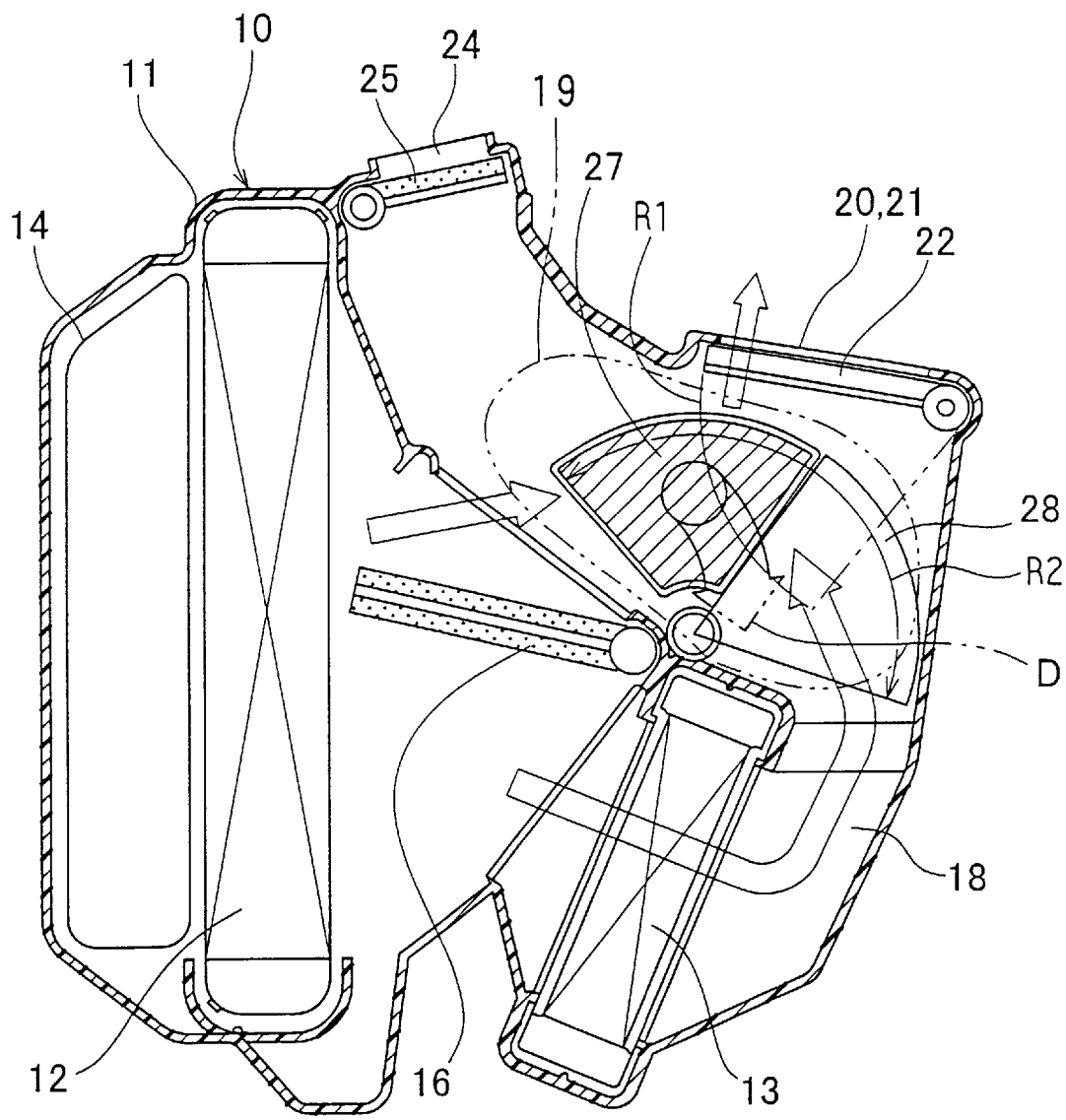
FIG. 3 is a vertical sectional view of the air conditioning unit, showing rotation locus ranges of a foot door and a face door, according to the first embodiment.

In FIG. 3, R1 indicates a rotation locus range of the face door 22, R2 indicates a rotation locus range of the foot door 28. The rotation locus ranges R1 and R2 of both the doors 22, 28 are partially overlapped when the doors 22, 28 are viewed in the vehicle width direction (i.e., the direction perpendicular to the door surface of the foot door 28). In the first embodiment, as shown in FIG. 2, the face door 22 has a length L1 in the vehicle width direction, the right and left foot doors 28 are separated by a distance L2 in the vehicle width direction, and the distance L2 between the right and left foot doors 28 is set larger than the length L1 of the foot door 22 by a predetermined amount (e.g., 5 mm).

Accordingly, even when the doors 22, 28 are disposed so that the rotation locus ranges R1, R2 are partially overlapped when being viewed in the axial direction (vehicle width direction), because both the foot doors 28 are rotatable along the inner surfaces of the side wall portions 11b of the air conditioning case 11 at right and left sides of the face door 22 in the vehicle width direction. Therefore, an interference between both the doors 22 and 28 can be prevented.

In addition, the radius center of the approximate fan shape of the foot opening 27 is set at the lower side position opposite to the rotation shaft 23 of the face door 22 relative to the arc peripheral portion of the foot opening 27, and the rotation shaft 29 is disposed at the radius center of the approximate fan shape of the foot opening 27. Therefore, an interference between the rotation shaft 29 of the foot doors 28 and the face door 22 can be effectively prevented.

Figure 4A:
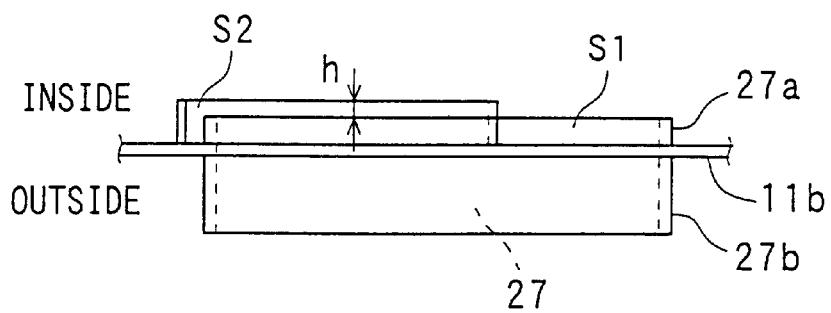
FIGS. 4A and 4C are schematic sectional views and FIG. 4B is a side view, each showing a foot opening in an air conditioning case, according to the first embodiment.
Figure 4B:
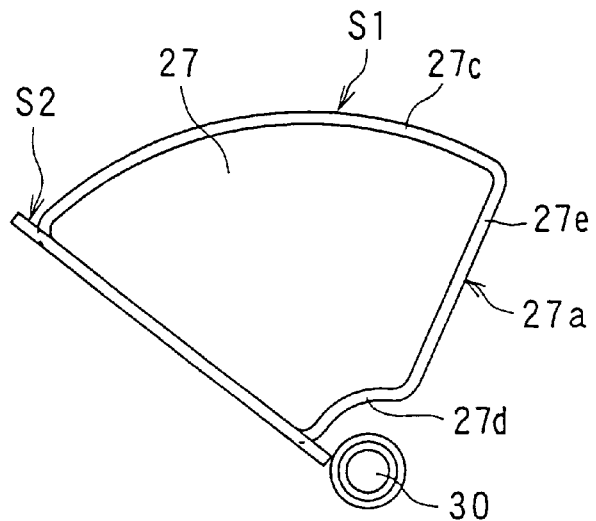
Figure 4C:
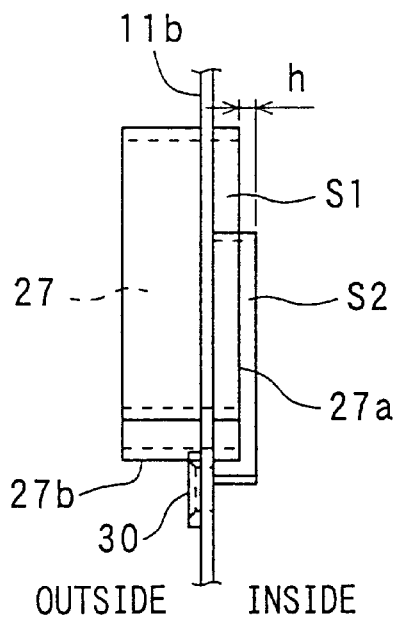

Next, a seal structure of the foot door 28 will be now described with reference to FIGS. 4A–6D. FIGS. 4A–4C show the shape of the foot opening 27 in the air conditioning case 11. As shown in FIGS. 4A–4C, a bearing hole 30, in which the rotation shaft 29 of the foot door 28 is rotatably held, is opened in the air conditioning case 11 at a position of the radius center of the approximate fan shape of the foot opening 27. A wall part of the air conditioning case 11, defining the foot opening 27, has an inside protrusion portion 27a protruding inside the air-conditioning case 11 in an approximate fan-shaped closed-loop like, and an outside protrusion portion 27b protruding outside the air conditioning case 11 in an approximate fan-shaped closed-loop like. As shown in FIG. 4B, in the inside protrusion portion 27a, an outer peripheral surface 27c, an inner peripheral surface 27d and one side surface 27e (right side surface in FIG. 4B) construct a first seal surface S1. The other side surface (left side surface in FIG. 4B) in the inside protrusion portion 27a constructs a second seal surface S2 that protrudes inside the air conditioning case 11 more than the first seat surface S1 by a predetermined dimension "h" as shown in FIGS. 4A and 4C.

Figure 5A:
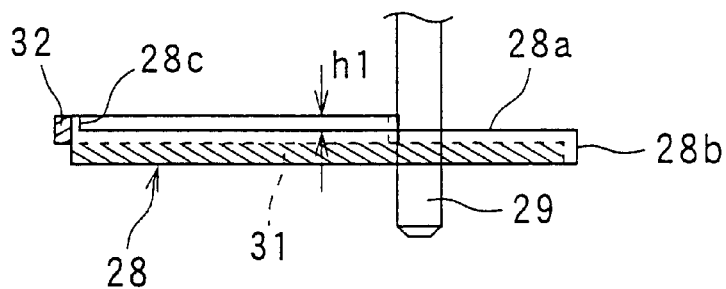
FIGS. 5A and 5C are schematic sectional views and FIG. 5B is a side view, each showing a foot door for opening and closing the foot opening, according to the first embodiment.
Figure 5B:
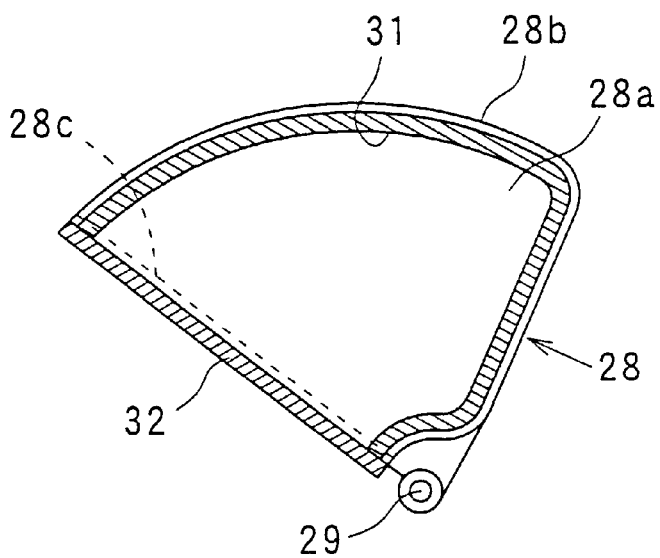
Figure 5C:
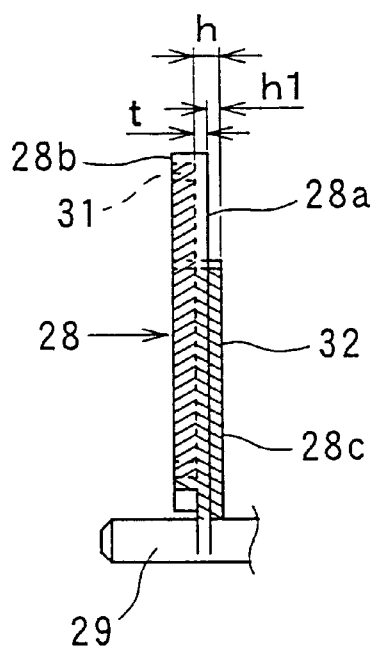

On the other hand, the foot door 25 is formed as shown in FIGS. 5A–5C. As shown in FIGS. 5A–5C, the foot door 28 has a plate member 28a constructing the door surface, and the plate member 28a is formed into an approximate fan shape. A surface of the plate member 28a, facing the inside protrusion portion 27a of the foot opening 27 is set to be moved on a top end portion of the inside protrusion portion 27a of the foot opening 27, as shown in FIG. 6D. Here, as shown in FIG. 6D, a small clearance "j" (e.g., 1 mm) is set between the top end portion of the inside protrusion portion 27a and the plate member 28a of the foot door 28 so that friction force therebetween can be reduced while the foot door 28 moves.

A periphery protrusion portion 28b protruding toward the inside protrusion portion 27a is formed in the plate member 28a to correspond to the shape of the first seal surface S1 around the foot opening 27. A first seal member 31 is fixed on an entire surface of the periphery protrusion portion 28b, by using a bonding material or the like. A side portion 28c (i.e., left side portion in FIG. 5B) protruding toward a side opposite to the inside protrusion portion 27a (protruding toward inside the case 11) is formed in the plate member 28a of the foot door 28. In the first embodiment, the sum of a protrusion amount h1 of the side portion 28c and a plate thickness "t" of the plate member 28a is set to be equal to the protrusion amount "h" of the second seal surface S2 (i.e., h=t+h1) of the foot opening 27. A second seal member 32 is fixed onto the side portion 28c by using a bonding material or the like.

In the first embodiment, an elastic material such as a foamed resin can be used as a material of the first and second seal members 31, 32. The first seal member 31 of the foot door 28 press-contacts the first seal surface S1 of the inside protrusion portion 27a of the foot opening 27 while being elastically deformed. The second seal member 32 of the foot door 28 press-contacts the second seal surface S2 of the inside protrusion portion 27a of the foot opening 27 while being elastically deformed.

Figure 6A:
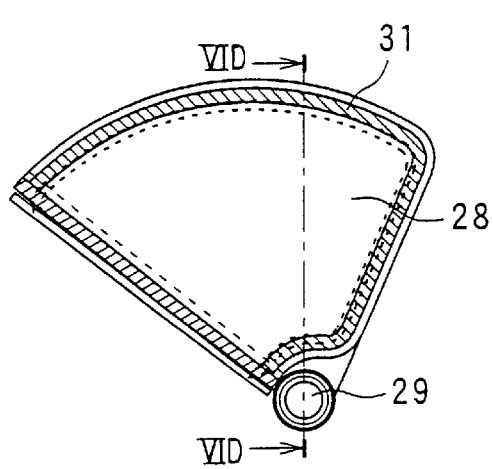
FIGS. 6A–6C are side views each showing operation of the foot door.
Figure 6B:
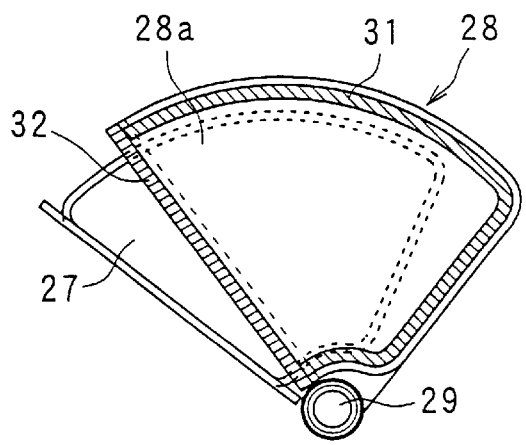
Figure 6C:
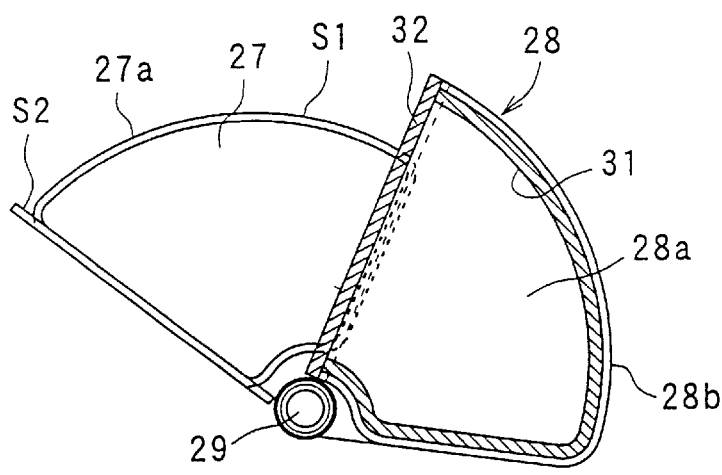
Figure 6D:
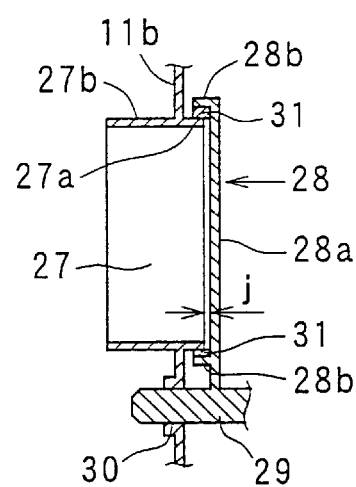
FIG. 6D is a cross-sectional view taken along line VID—VID in FIG, 6A.

FIG. 6A shows the position of the foot door 28 when the foot door 28 fully closes the foot opening 27, FIG. 6B shows the position of the foot door 28 when the foot door 28 opens the foot opening 27 by an opening degree, and FIG. 6C shows the position of the foot door 28 when the foot door 28 fully opens the foot opening 27.

The face door 22, the defroster door 25 and the foot doors 28 are mode switching doors for switching an air outlet mode. The doors 22, 25, 28 are rotatably connected to rotation shafts 23, 26, 29, respectively. Each of the rotation shafts 23, 26, 29 is disposed to extend in the vehicle width direction. That is, each of the rotation shafts 23, 26, 29 extends in a direction perpendicular to the door surface of the plate member 28a of the foot door 28. The rotation shafts 23, 26, 29 are connected to a mode switching actuator using a servomotor or a manual operation mechanism through a link mechanism, to be operatively linked with each other by the mode switching actuator and the manual operation mechanism.

Next, operation of the air conditioner according to the first embodiment of the present invention will be now described. In the first embodiment, by selecting the operation positions of the face door 22, the defroster door and the foot doors 28, the following air outlet mode such as a face mode, a bi-level mode, a foot mode and a defroster mode can be selected.

(1) Face Mode

Figure 7:
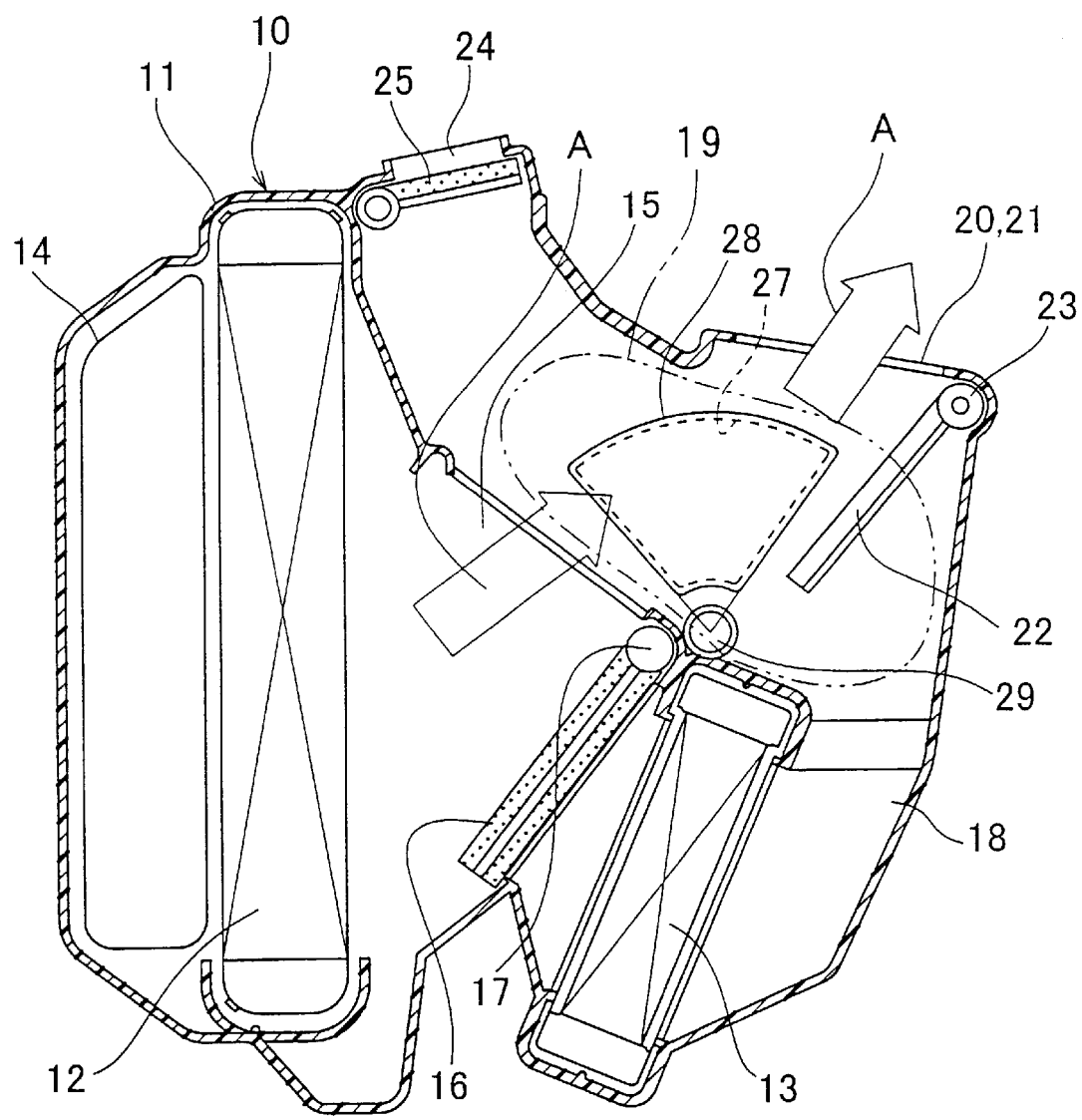
FIG. 7 is a vertical sectional view showing the air conditioning unit in a face mode, according to the first embodiment.

When the face mode is selected as shown in FIG. 7, the face door 22 fully opens the face openings 20, 21, and the defroster door 25 fully closes the defroster opening 24. Further, the foot doors 28 are operated to the position in FIG. 6A to fully close the foot opening 27. In the face mode, when the air mixing door 16 fully closes the air passage of the heater core 13 to fully open the bypass passage 15, all air blown by the blower unit is cooled in the evaporator 12 and is blown toward the face side of a passenger in the passenger compartment through the face openings 20, 21, as shown by arrow A in FIG. 7. In FIG. 7, the air mixing door 16 is positioned at the maximum cooling position. However, in the face mode, the air mixing door 16 can be operated to an opening degree position in accordance with a set temperature of the passenger compartment. When the air mixing door 16 is operated to an intermediate opening degree position, a part of air from the evaporator 12 passes through the heater core 13 to be heated and the other part of air from the evaporator 12 passes through the bypass passage 16 so that conditioned air having a desired temperature can be obtained in the air mixing portion 19. Accordingly, in the face mode, conditioned air having a desired temperature can be blown toward the face side of the passenger in the passenger compartment through the face openings 20, 21.

(2) Bi-level Mode

Figure 8:
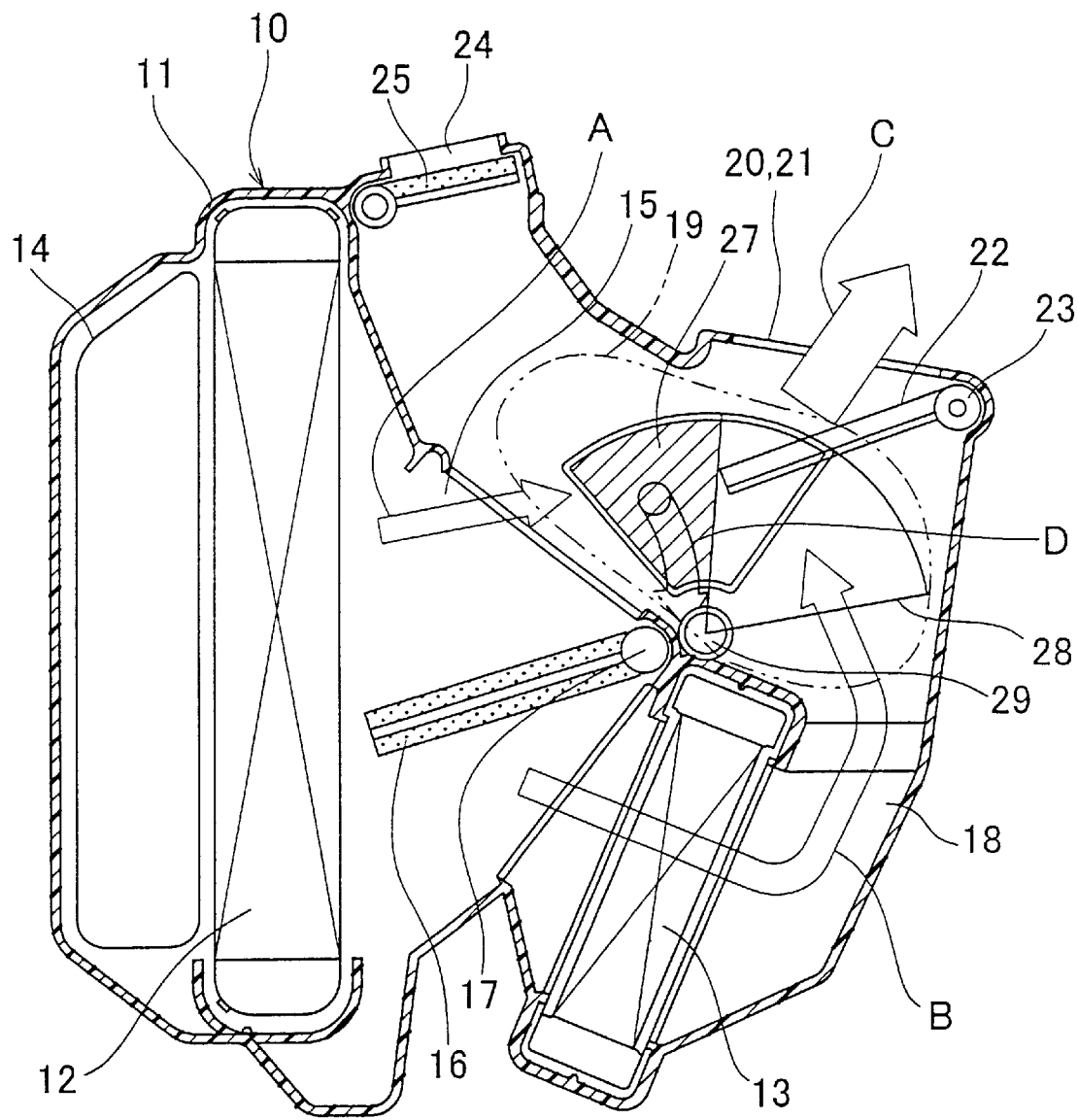
FIG. 8 is a vertical sectional view showing the air conditioning unit in a bi-level mode, according to the first embodiment.

When the bi-level mode is set as shown in FIG. 8, the defroster door 25 is operated to fully close the defroster opening 24, similar to the face mode in FIG. 7. In the bi-level mode, the face door 22 opens the face openings 20, 21 in an approximate half opening state, and the foot doors 28 open the foot openings 27 in an approximate half opening state. Generally, because the bi-level mode is used in a middle season such as the spring and the autumn, the air mixing door 16 is operated at a middle opening degree. Therefore, as shown in FIG. 8, the flow ratio between cool air A passing through the bypass passage 15 from the evaporator 12 and warm air B passing through the heater core 13 is adjusted by the opening degree of the air mixing door 16. Thereafter, cool air A from the bypass passage 15 and warm air B from the heater core 13 are mixed in the air mixing portion 19 to be conditioned air, and conditioned air is blown toward the face side of the passenger in the passenger compartment from the face openings 20, 21.

The foot openings 27 are provided to be overlapped with the air mixing portion 19 at both right and left sides of the air mixing portion 19. Therefore, cool air A and warm air B flowing toward the air mixing portion 19 branch and flow into the right and left foot openings 27 provided on the right and left side wall portions 11b of the air conditioning case 11. Cool air A and warm air B flow toward the foot openings 27 while being mixed, and the mixed air flows toward the foot area of the passenger in the passenger compartment from the right and left foot openings 27.

(3) Foot Mode

Figure 9:
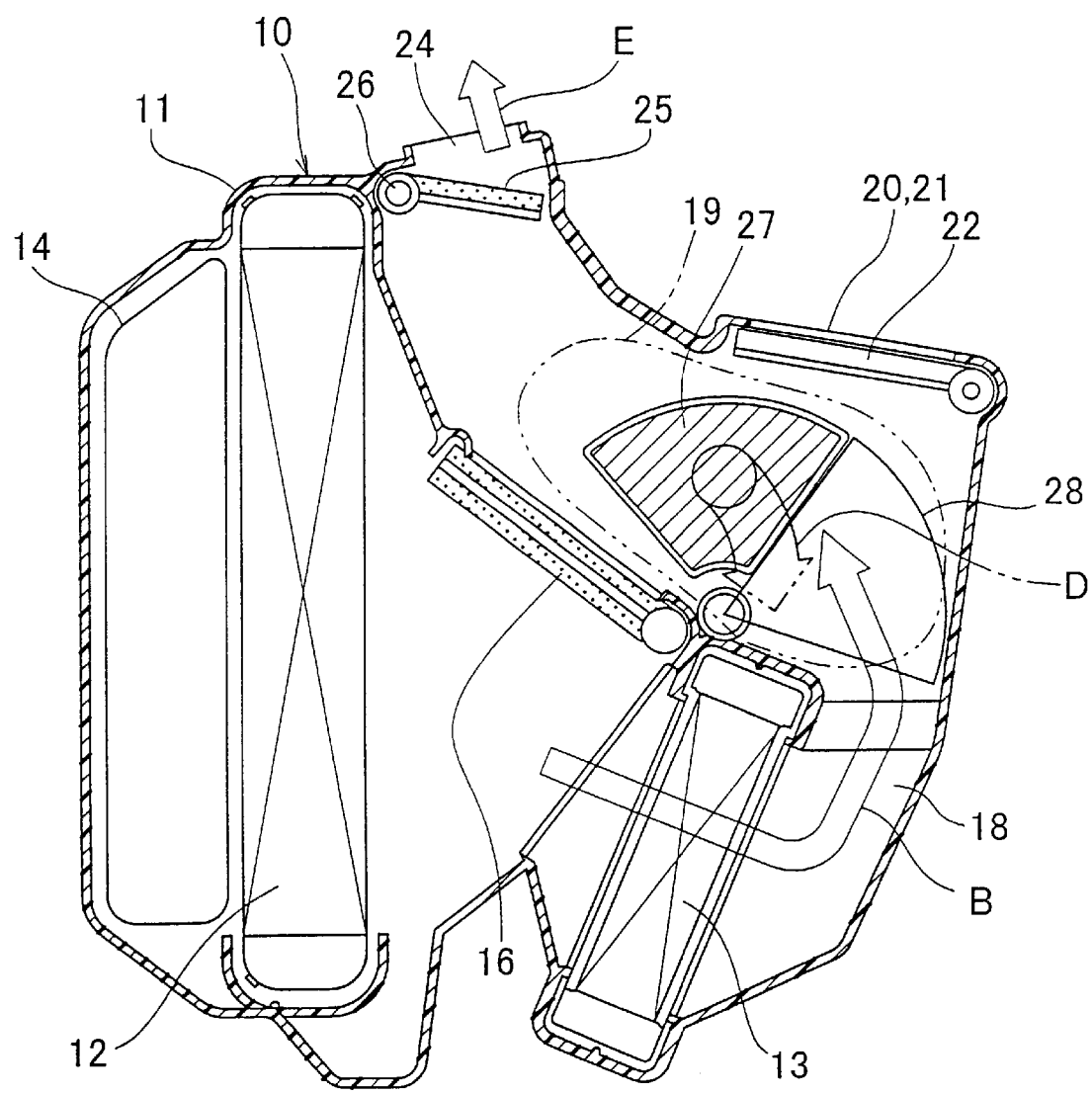
FIG. 9 is a vertical sectional view showing the air conditioning unit in a foot mode, according to the first embodiment.

When the foot mode is set as shown in FIG. 9, the defroster door 25 slightly opens the defroster opening 24, and the face door 22 fully closes the face openings 20, 21. In addition, the foot doors 28 are operated to fully open the foot openings 27.

In the example of FIG. 9, the air mixing door 16 is operated at the maximum heating position to fully close the bypass passage 15 and to fully open the air passage of the heater core 13. Accordingly, all air blown by the blower unit passes through the evaporator 12 and flows into the heater core 13 to be heated in the heater core 13. Warm air heated in the heater core 13 flows into the air mixing portion 19 through the warm air passage 18 as shown by arrow B in FIG. 9. Almost warm air in the air mixing portion 19 branches and flows into the right and left foot openings 27 as shown by arrow D in FIG. 9, and is blown toward the foot area of the passenger in the passenger compartment from the right and left foot openings 27.

In the foot mode, a part of warm air flows from the air mixing portion 19 into the defroster opening 24, and is blown toward an inner surface of the front windshield from the defroster opening 24 to defrost the windshield. In the foot mode, by suitably adjusting the mixing ratio between cool air and warm air using the air mixing door 16, the temperature of air blown into the passenger compartment can be suitably controlled.

(4) Defroster Mode

Figure 10:
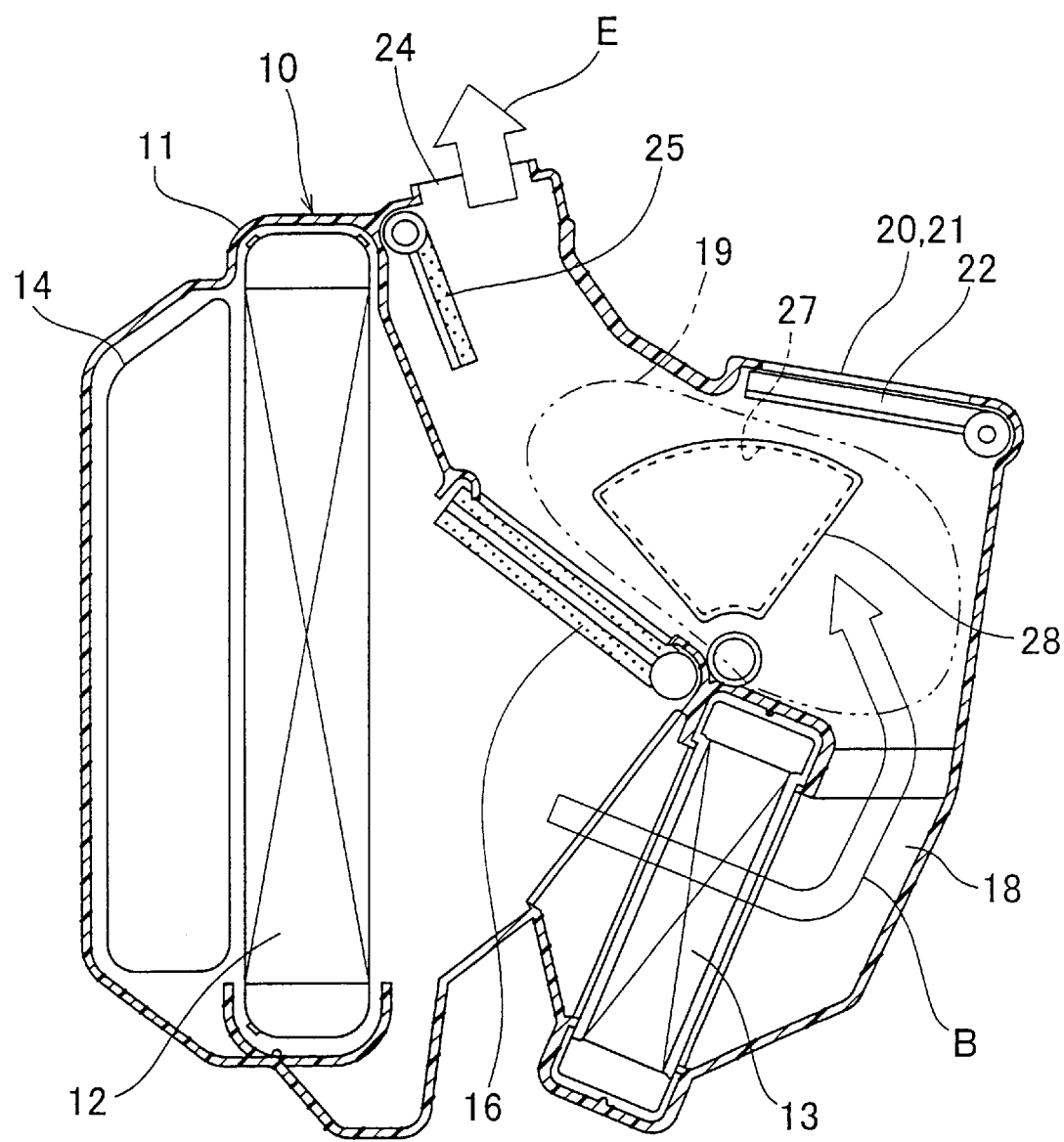
FIG. 10 is a vertical sectional view showing the air conditioning unit in a defroster mode, according to the first embodiment.

When the defroster mode is set as shown in FIG. 10, the defroster door 25 is operated to fully open the defroster opening 24. Further, the face door 22 fully closes the face openings 20, 21, and the foot doors 28 fully close the foot openings 27. In an example shown in FIG. 10, the air mixing door 16 is operated to the maximum heating position to fully closes the bypass passage 15 and to fully open the air passage of the heater core 13. Accordingly, all air blown from the blower unit flows into the heater core 13 after passing through the evaporator 12. Warm air from the heater core 13 flows into the air mixing portion 19 after flowing upwardly through the warm air passage 18, and is introduced into the defroster opening 24. Thereafter, warm air is blown toward an inner surface of the front windshield from the defroster opening 24 to defrost the front windshield. Even in the defroster mode, temperature of air blown toward the inner surface of the windshield can be controlled by adjusting the operation position of the air mixing door 16.

Further, a foot/defroster mode can be set as the ait-outlet mode. In the foot/defroster mode, the air amount blown from the defroster opening 24 is increased, as compared with that in the foot mode. In the foot/defroster mode, the air amount blown from the foot openings 27 is made approximately equal to the air amount blown from the defroster opening 24.

According to the first embodiment of the present invention, when the foot doors 28 are rotated around the rotation shaft 29 from the fully opened position of the foot opening 27 shown in FIG. 6C counterclockwise, each plate member 28a moves on the top portion of the inside protrusion portion 27a of the foot opening 27 along the side wall portions 11b, so that the opening area of the foot opening 27 is gradually reduced.

When the foot door 28 moves from the position shown in FIG. 6C to the position shown in FIG. 6A, the plate member 28a of the foot door 28 fully closes the opening area of the foot opening 27. In this case, the first seal member 31 of the foot door 28 press-contacts the first seal surface S1 of the inside protrusion portion 27a of the foot opening 27 while being elastically deformed. Simultaneously, the second seal member 32 of the foot door 28 press-contacts the second seal surface S2 of the inside protrusion portion 27a to be elastically deformed. Accordingly, when the foot door 28 fully closes the foot opening 27, air-sealing performance can be effectively improved, and it can prevent air from being leaked from the foot opening 27. In the first embodiment, the second seal surface S2 of the inside protrusion portion 27a is also used as a position determining portion for determining a fully closed position of the foot door 28.

According to the first embodiment of the present invention, the right and left foot doors 28 are rotated in the vehicle front-rear direction along the side wall portions 11b of the air conditioning case 11 at both the right and left sides of the air mixing portion 19. That is, the foot doors 28 are rotated in a direction (e.g., the vehicle front-rear direction) perpendicular to the rotation direction (e.g., the vehicle up-down direction) of the face door 22. In addition, the rotation shaft 29 connecting the right and left foot doors 28 is positioned outside the rotation locus range R1 of the face door 22, and the distance L2 between the right and left foot doors 28 is set larger than the length L1 of the foot door 22 by a predetermined amount (e.g., 5 mm) in the vehicle width direction. Accordingly, even when the rotation locus ranges R1, R2 of the doors 22, 28 are overlapped when being viewed in the vehicle width direction, an interference between both the doors 22 and 28 can be accurately prevented. As a result, it is unnecessary to form a special operation space for the foot doors 28, and the size of the air conditioning unit 10 can be reduced.

Because the foot doors 28 move along the right and left side wall portions 11b at both sides of the air mixing portion 19, air flowing toward the face openings 20, 21 or air flowing toward the defroster opening 24 is not disturbed by the rotation operation of the foot doors 28. In addition, the right and left foot openings 27 are opened and closed only by using the right and left foot doors 28, the face openings 20, 21 are opened and closed only by using the face door 22, and the defroster opening 24 is opened and closed only by using the defroster door 25. Accordingly, each opening area of the openings 27, 20, 21, 24 can be readily freely set, and the air conditioner can be readily used for various vehicles.

In the first embodiment, the radius center of the circular arc periphery of the approximate fan shape of the foot door 28 is set to be slightly shifted from the radius center of the circular arc periphery of the approximate fan shape of the foot opening 27, in the axial direction of the rotation shaft 29. Therefore, when the foot door 28 moves from a fully opening state of the foot opening 27 to a fully closing state thereof, the first and second seal members 31, 32 of the foot door 28 separate from the first and second seal surfaces S1, S2 of the inside protrusion portion 27a of the foot opening 27, as shown in FIG. 6B.

When the foot door 28 moves to a position proximate to the fully closing position of the foot opening 27, the first and second seal members 31, 32 of the foot doors 28 press-contact the first and second seal surfaces S1, S2 of the inside protrusion portions 27a, respectively. As a result, in an opening state of the foot opening 27, before the foot door 28 fully closes the foot opening 27, a slidable friction of the first and second seal members 31, 32 is not caused, and operation force of the foot door 28 can be reduced.

Because the small clearance (micro clearance) "j" is set between the plate member 28a of the foot door 28 and the protrusion end portion of the inside protrusion portion 27a of the foot opening 27, the operation force of the foot door 28 can be effectively reduced.

Figure 11:
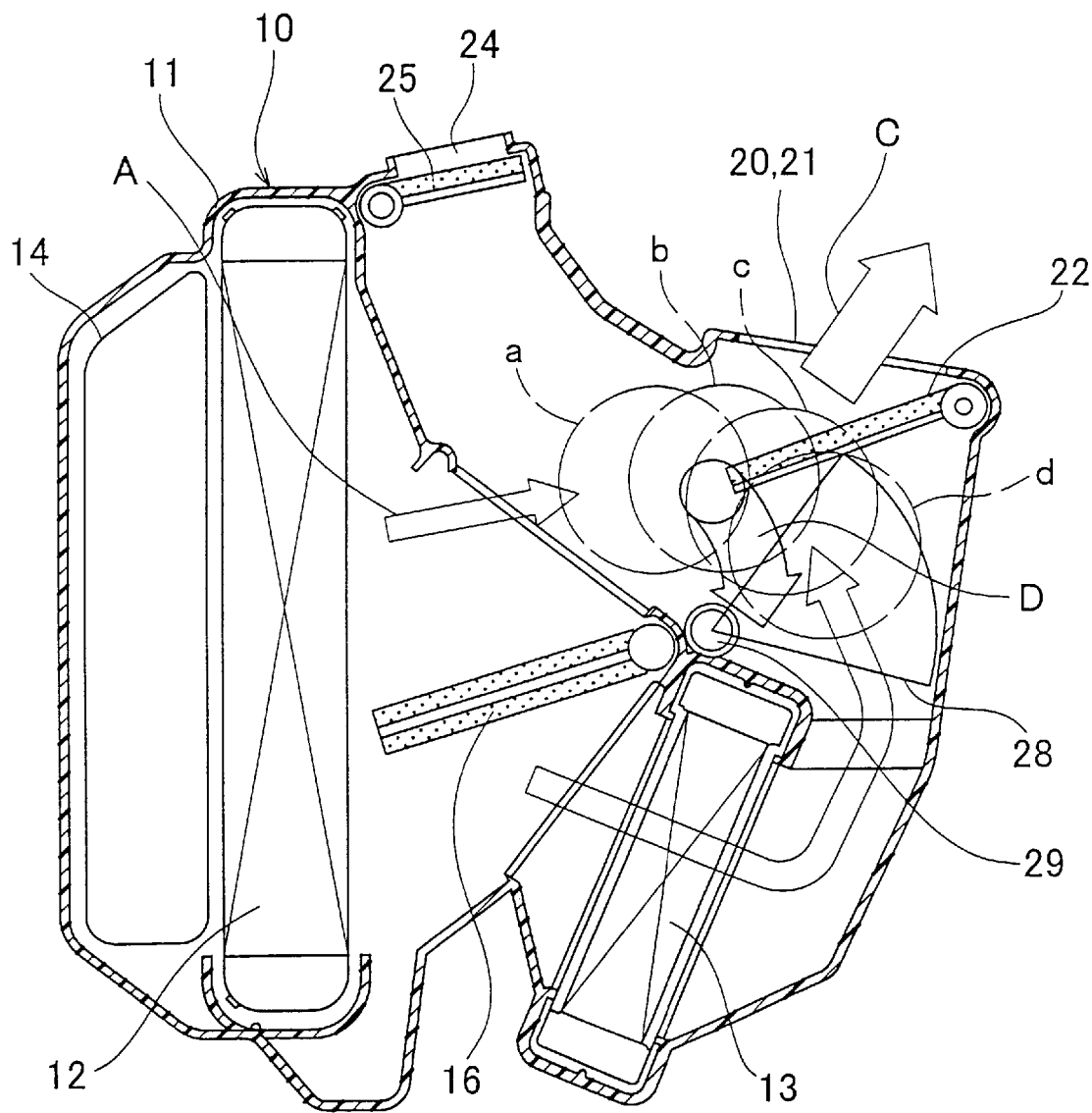
FIG. 11 is a vertical sectional view of the air conditioning unit, showing position selection ranges of the foot opening, according to the first embodiment.
Figure 12:
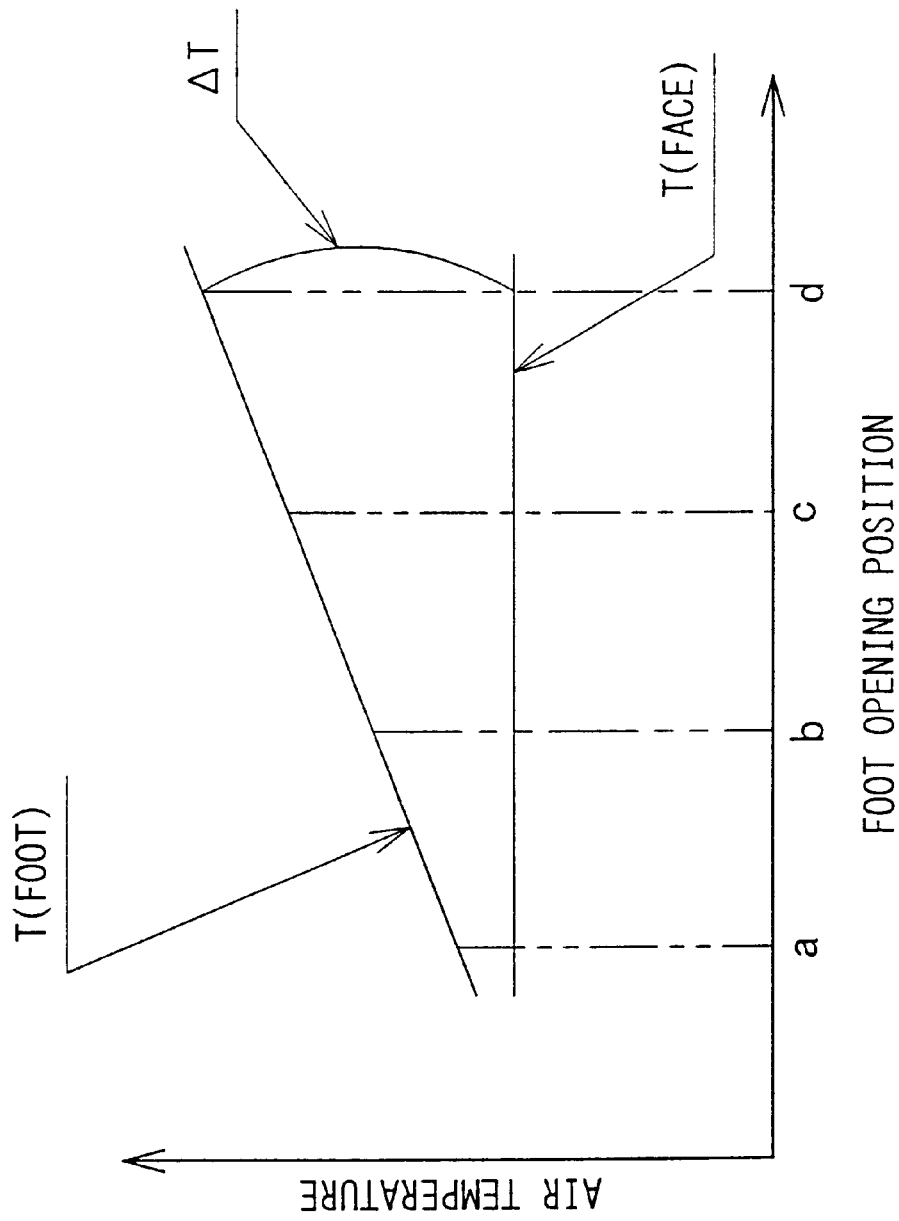
FIG. 12 is a graph showing a relationship between a position of the foot opening, and a temperature difference between air blown toward a lower side of a passenger compartment and air blown toward an upper side of the passenger compartment, according to the first embodiment.

In the first embodiment, the arrangement position of the foot opening 27 can be changed as shown by "a", "b", "c", "d" in FIG. 11. Even in this case, the above-described advantage can be obtained. Further, when the arrangement position of the foot opening 27 is changed as shown by "a", "b", "c", "d" in FIG. 11, a temperature difference ΔT between air temperature T(FOOT) blown from the foot openings 27 and air temperature T(FACE) blown from the face openings 20, 21 can be changed as shown in FIG. 12. Specifically, as the position of the foot openings 27 is changed from the vehicle front side to the vehicle rear side in this order of "a", "b", "c" and "d", the flow ratio of cool air A is reduced, and the flow ratio of warm air B is increased. Therefore, as shown in FIG. 9, the temperature T(FOOT) of air blown from the foot openings 27 is increased, as the position of the foot openings 27 is changed from the vehicle front side to the vehicle rear side in this order of "a", "b", "c" and "d". Because the positions of the face openings 20, 21 are constant relative to the air mixing portion 19, the temperature T(FACE) of air blown from the face openings 27 is maintained at a constant temperature. As a result, the temperature difference ΔT between the air temperature T(FOOT) blown from the foot openings 27 and the air temperature T(FACE) blown from the face openings 20, 21 is increased, as the position of the foot openings 27 is changed from the vehicle front side to the vehicle rear side in this order of "a", "b", "c" and "d". Thus, even when a request for the temperature difference ΔT between air blown toward the lower side and air blown toward the upper side is different in each vehicle, the temperature difference ΔT can be readily changed by suitably changing the positions of the foot openings 27.

In FIG. 12, during the bi-level mode, the relationship between the temperature difference ΔT and the position of the foot openings 27 is indicated. Similarly to the bi-level mode, in each of the foot mode and the foot/defroster mode, the temperature difference ΔT between air blown toward the lower side and air blown toward the upper side in the passenger compartment can be readily changed by suitably changing the positions of the foot openings 27.

A second preferred embodiment of the present invention will be now described with reference to FIGS. 13A–13D. In the above-described first embodiment, when the foot opening 27 is fully closed, the first seal member 31 press-contacts the first seal surface S1 of the inside protrusion portion 27a of the foot opening 27 from an outside so that seal function is obtained. However, in the second embodiment, an inner surface of the inside protrusion portion 27a of the foot opening 27 is used as the first seal surface S1, and the first seal member 31 of the foot door 28 press-contacts the first seal surface S1.

Figure 13A:
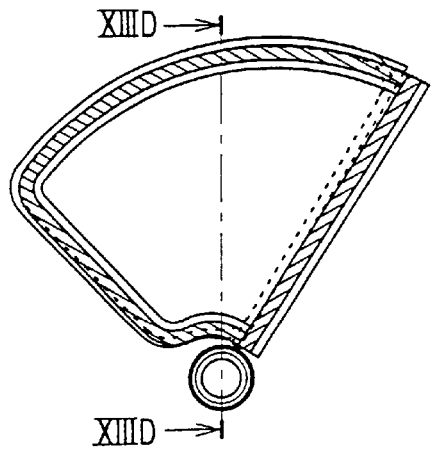
FIGS. 13A–13C are side views each showing operation of the foot door.
Figure 13B:
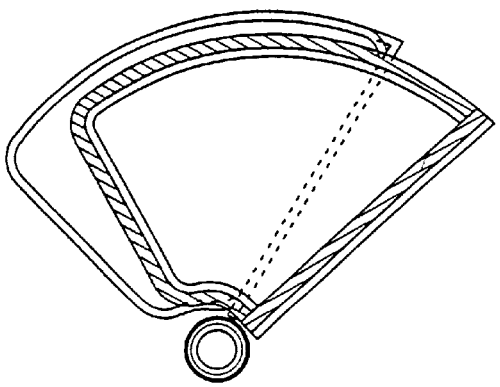
Figure 13C:
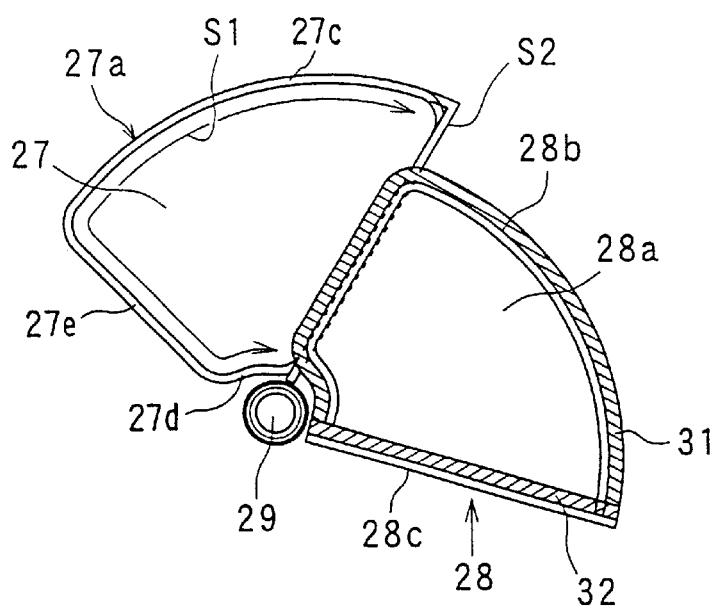
Figure 13D:
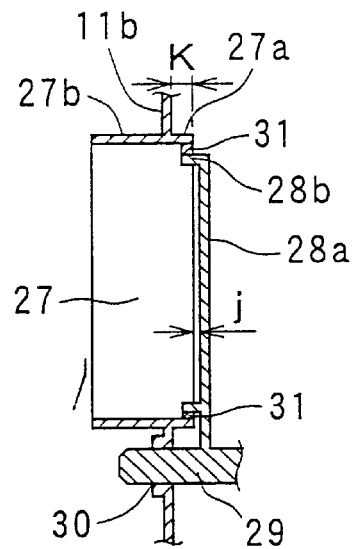
FIG. 13D is a cross-sectional view taken along line XIIID—XIIID in FIG, 13A, according to a second embodiment of the present invention.

Specifically, as shown in FIG. 13C, in the inside protrusion portion 27a, an outer peripheral surface 27c, an inner peripheral surface 27d and one side surface 27e (left side surface of FIG. 11C) construct an approximate U-shaped portion having a first seal surface S1 on the inner side in a range shown by the arrows in FIG. 13C. The approximate U-shaped portion having the first seal surface S1 protrudes from the side wall portion 11b by a predetermined protrusion amount K. The other side surface (right side surface in FIG. 13C) in the inside protrusion portion 27a is used as a second seal surface S2. A protrusion amount of the second seal surface S2 is made smaller than the protrusion amount K of the first seal surface S1 by a predetermined amount, so that a periphery protrusion portion 28b of the foot door 28 moves on the second seal surface S2 and is close to the inner peripheral side of the inside protrusion portion 27a.

On the other hand, the periphery protrusion portion 28b is provided on the periphery of the plate member 28a of the foot door 28 to have an outer periphery surface, an inner periphery surface and one side surface (i.e., left side surface in FIG. 11C). A first seal member 31 is fixed on all the outer surface of the periphery protrusion portion 28b by using a bonding material or the like. A side portion 28c (i.e., right side portion in FIG. 13B) protruding toward the inside protrusion portion 27a more than the periphery protrusion portion 28b is formed in the plate member 28a of the foot door 28. Therefore, a protrusion top end of the side portion 28c of the foot door 28 contacts the second seal surface S2 when the foot door 28 closes the foot opening 27. A second seal member 32 is fixed to the protrusion top end of the side portion 28c of the foot door 28.

According to the second embodiment of the present invention, when the foot opening 27 is fully closed by the foot door 28, the first seal member 31 of the periphery protrusion portion 28b having an approximate U shape of the foot door 28 press-contacts the first seal surface S1 on the inner side of the inside protrusion portion 27a of the foot opening 27, and the second seal member 32 of the side portion 28c of the foot door 28 press-contacts the second seal surface S2 on the outside of the inside protrusion portion 27a in the foot opening 27. Therefore, when the foot opening 27 is fully closed, air-sealing performance can be improved.

In the second embodiment, the other parts are similar to those of the above described first embodiment, and detail explanation is omitted. Accordingly, in the second embodiment, the advantage described in the first embodiment can be obtained.

Although the present invention has been fully described in connection with the preferred embodiments thereof with reference to the accompanying drawings, it is to be noted that various changes and modifications will become apparent to those skilled in the art.

For example, in the above-described first and second embodiments, a packing-like seal member made of an elastic material such as a foamed resin is used as the first and second seal members 31, 32. However, a lip-like seal member made of a rubber material also can be used as the first and second seal members 31, 32.

In the above-described first and second embodiments of the present invention, the foot opening 27 and the foot door 28 are formed into an approximate fan shape. However, the foot opening 27 and the foot door 28 may be formed into a trapeziform shape or the like.

In the above-described first and second embodiments of the present invention, the foot door 28 is moved by the rotation. However, the foot door 28 can be made to be straightly reciprocated.

In the above-described first and second embodiments of the present invention, both the foot doors 28 are connected to each other through the common rotation shaft 29. However, the common rotation shaft 29 can be omitted. In this case, a driving unit such as a motor is provided to correspond to each of the foot doors 28, so that each of the foot doors 28 can be directly driven by the driving unit. Further, in the above-described first and second embodiments, a single foot opening 27 and a single foot door 28 can be provided.

Such changes and modifications are to be understood as being within the scope of the present invention as defined by the appended claims.

What is claimed is:

1. An air conditioner for a vehicle having a passenger compartment, comprising:
  a case defining an air passage through which air flows toward the passenger compartment, the case having a first opening and a second opening from which air is blown into the passenger compartment toward different sides;
  a cooling heat exchanger disposed in the case, for cooling air passing therethrough;
  a heating heat exchanger disposed in the case at a downstream air side of the cooling heat exchanger, for heating air passing therethrough;
  a first door disposed for opening and closing the first opening; and a second door disposed for opening and closing the second opening, wherein:
the case includes a first wall portion positioned at one side when being viewed in a flow direction of air passing through the cooling heat exchanger and the heating heat exchanger, and a second wall portion extending in a direction approximately perpendicular to the first wall portion;
the first opening is provided in the first wall portion, and the second opening is provided in the second wall portion;
the first door includes a plate member having a door surface moved along a surface of the first wall portion;
the first door is disposed to open and close the first opening by a movement of the door surface along the surface of the first wall portion;
the first door has an operation locus that is overlapped with an operation locus of the second door when being viewed in a direction perpendicular to the door surface of the first door; and
the first door is disposed to be offset from the second door in the direction perpendicular to the door surface of the first door.

2. An air conditioner for a vehicle having a passenger compartment, comprising:
a case defining an air passage through which air flows toward the passenger compartment, the case having a first opening and a second opening from which air is blown into the passenger compartment toward different sides;
a cooling heat exchanger disposed in the case, for cooling air passing thereto rough;
a heating heat exchanger disposed in the case at a downstream air side of the cooling heat exchanger, for heating air passing therethrough;
a first door disposed for opening and closing the first opening; and
a second door disposed for opening and closing the second opening, wherein:
the case includes a first wall portion positioned at one side when being viewed in a flow direction of air passing through the cooling heat exchanger and the heating heat exchanger, and a second wall portion extending in a direction approximately perpendicular to the first wall portion;
the first opening is provided in the first wall portion, and the second opening is provided in the second wall portion;
the first door includes a plate member having a door surface moved along a surface of the first wall portion;
the first door is disposed to open and close the first opening by a movement of the door surface along the surface of the first wall portion;
a wall part of the case, defining the first opening, has a protrusion portion protruding from the surface of the first wall portion inside the case;
the protrusion portion is formed into a closed loop and has a seal surface;
the first door has a seal member provided to correspond to the seal surface of the protrusion portion; and
when the first door closes the first opening after moving on a top end portion of the protrusion portion, the seal member of the first door press-contacts the seal surface of the protrusion portion.

3. The air conditioner according to claim 2, wherein:
while the first door moves from a fully opening position of the first opening toward a fully closing position of the first opening, the seal member of the first door is separated from the seal surface of the protrusion portion; and
when the first door moves to the fully closing position of the first opening, the seal member of the first door press-contacts the seal surface of the protrusion portion.

4. An air conditioner for a vehicle having a passenger compartment, comprising:
a case defining an air passage through which air flows toward the passenger compartment, the case having a first opening and a second opening from which air is blown into the passenger compartment toward different sides;
a cooling heat exchanger disposed in the case, for cooling air passing therethrough;
a heating heat exchanger disposed in the case at a downstream air side of the cooling heat exchanger, for heating air passing therethrough;
a first door disposed for opening and closing the first opening; and
a second door disposed for opening and closing the second opening, wherein:
the case includes a first wall portion positioned at one side when being viewed in a flow direction of air passing through the cooling heat exchanger and the heating heat exchanger, and a second wall portion extending in a direction approximately perpendicular to the first wall portion;
the first opening is provided in the first wall portion, and the second opening is provided in the second wall portion;
the first door includes a plate member having a door surface moved along a surface of the first wall portion; and
the first door is disposed to open and close the first opening by a movement of the door surface along the surface of the first wall portion;
the heating heat exchanger is disposed in the case to form a bypass passage through which air from the cooling heat exchanger bypasses the heating heat exchanger; and
the air passage of the case includes an air mixing portion in which air passing through the heating heat exchanger and air passing through the bypass passage are mixed, the air conditioner further comprising:
an air mixing door disposed to adjust a flow ratio between an air amount passing through the heating heat exchanger and an air amount passing through the bypass passage,
wherein the first opening is provided within an area of the air mixing portion when being viewed from an opening direction of the first opening in the first wall portion.

5. The air conditioner according to plain 4, wherein:
the first wall portion is provided at both sides of the cooling heat exchanger and the heating heat exchanger;
the first opening has two openings parts provided at both sides of the cooling heat exchanger and the heating heat exchanger to correspond to the first wall portion; and
the first door has two door members for opening and closing the two opening parts of the first opening, respectively.

6. The air conditioner according to claim 5, wherein the two door members are coupled to each other through a shaft member provided in the case.

7. The air conditioner according to claim 5, wherein:
the first door and the second door are disposed in such a manner that an operation locus of the first door is overlapped with an operation locus of the second door when being viewed from a direction perpendicular to the door surface of the first door; and
the second door is disposed between the two door members of the first door to have a predetermined clearance between the second door and each door member of the first door in the direction perpendicular to the door surface of the first door.

8. The air conditioner according to claim 7, wherein:
the first door is disposed to be rotatable around a first rotation shaft provided in the case;
the second door is disposed to be rotatable around a second rotation shaft provided in the case; and
each of the first rotation shaft and the second rotation shaft is disposed to extend in a direction parallel to the direction perpendicular to the door surface of the first door.

9. The air conditioner according to claim 8, wherein:
the first opening is formed into an approximate fan shape;
the first door is formed into an approximate fan shape corresponding to the shape of the first opening;
the approximate fan shape of the first opening has an outer peripheral portion having an approximate arc shape;
a radius center of the approximate fan shape is set at a side opposite to the second rotation shaft of the second door relative to the outer peripheral portion; and
the first shaft of the first door is disposed at a position corresponding the radius center of the approximate fan shape of the first opening.

10. The air conditioner according to claim 8, wherein:
the first wall portion are right and left side case parts of the case in a vehicle width direction;
the second wall portion is a top case part of the case in a vehicle vertical direction;
the two opening parts of the first opening are provided for blowing air toward right and left lower sides in the passenger compartment; and
the second opening is provided for blowing air toward an upper side in the passenger compartment.

11. An air conditioner combined with a vehicle having a passenger compartment,
a case disposed in the passenger compartment under an instrument panel of the vehicle at an approximate center in a vehicle width direction, for defining an air passage through which air flows toward the passenger compartment, the case having a first opening from which air is blown toward a lower side of the passenger compartment and a second opening from which air is blown toward an upper side of the passenger compartment;
a cooling heat exchanger disposed in the case, for cooling air passing therethrough;
a heating heat exchanger disposed in the case at a downstream air side of the cooling heat exchanger, for heating air passing therethrough;
a first door disposed for opening and closing the first opening; and
a second door disposed for opening and closing the second opening, wherein:
the case includes a first wall portion positioned at one side of the cooling heat exchanger and the heating heat exchanger in a vehicle width direction, and a second wall portion extending in a direction approximately perpendicular to the first wall portion;
the first opening is provided in the first wall portion, and the second opening is provided in the second wall portion;
the first door includes a plate member having a door surface moved along a surface of the first wall portion; and
the first door is disposed to open and close the first opening by a movement of the door surface along the surface of the first wall portion.

12. The air conditioner according to claim 11, wherein the first opening is provided in the first wall portion at an upper side of the heating heat exchanger in a vehicle up-down direction.

13. The air conditioner according to claim 11, wherein:
the heating heat exchanger is disposed in the case to form a bypass passage through which air from the cooling heat exchanger bypasses the heating heat exchanger; and
the air passage of the case includes an air mixing portion in which air passing through the heating heat exchanger and air passing through the bypass passage are mixed, the air conditioner further comprising:
an air mixing door disposed to adjust a flow ratio between an air amount passing through the heating heat exchanger and an air amount passing through the bypass passage,
wherein the first opening is provided within an area of the air mixing portion when being viewed from an opening direction of the first opening in the first wall portion.

14. The air conditioner according to claim 11, wherein:
the first wall portion is provided at both sides of the cooling heat exchanger and the heating heat exchanger;
the first opening has two openings parts provided at both sides of the cooling heat exchanger and the heating heat exchanger to correspond to the first wall portion; and
the first door has two door members for opening and closing the two opening parts of the first opening, respectively.

15. The air conditioner according to claim 14, wherein the two door members are coupled to each other through a shaft member provided in the case.

16. The air conditioner according to claim 14, wherein:
the first door and the second door are disposed in such a manner that an operation locus of the first door is overlapped with an operation locus of the second door when being viewed from a direction perpendicular to the door surface of the first door; and
the second door is disposed between the two door members of the first door to have a predetermined clearance between the second door and each door member of the first door in the direction perpendicular to the door surface of the first door.

17. The air conditioner according to claim 16, wherein:
the first door is disposed to be rotatable around a first rotation shaft provided in the case;
the second door is disposed to be rotatable around a second rotation shaft provided in the case; and
each of the first rotation shaft and the second rotation shaft is disposed to extend in a direction parallel to the direction perpendicular to the door surface of the first door.

18. The air conditioner according to claim 17, wherein:

the first opening is formed into an approximate fan shape;

the first door is formed into an approximate fan shape corresponding to the shape of the first opening;

the approximate fan shape of the first opening has an outer peripheral portion having an approximate arc shape;

a radius center of the approximate fan shape is set at a side opposite to the second rotation shaft of the second door relative to the outer peripheral portion; and the first shaft of the first door is disposed at a position corresponding the radius center of the approximate fan shape of the first opening.

19. The air conditioner according to claim 17, wherein:

the first wall portion are right and left side case parts of the case in a vehicle width direction;

the second wall portion is a top case part of the case in a vehicle vertical direction;

the two opening parts of the first opening are provided for blowing air toward right and left lower sides in the passenger compartment; and the second opening is provided for blowing air toward an upper side in the passenger compartment.

20. The air conditioner according to claim 11, wherein:

a wall part of the case, defining the first opening, has a protrusion portion protruding from the surface of the first wall portion inside the case;

the protrusion portion is formed into a closed loop and has a seal surface;

the first door has a seal member provided to correspond to the seal surface of the protrusion portion; and when the first door closes the first opening after moving on a top end portion of the protrusion portion, the seal member of the first door press-contacts the seal surface of the protrusion portion.

21. The air conditioner according to claim 20, wherein:

while the first door moves from a fully opening position of the first opening toward a fully closing position of the first opening, the seal member of the first door is separated from the seal surface of the protrusion portion; and when the first door moves to the fully closing position of the first opening, the seal member of the first door press-contacts the seal surface of the protrusion portion.

22. The air conditioner according to claim 11, wherein:

the first door has an operation locus that is overlapped with an operation locus of the second door when being viewed in a direction perpendicular to the door surface of the first door; and the first door is disposed to be offset from the second door in the direction perpendicular to the door surface of the first door.

* * * * *